United States Patent
Wyle et al.

(10) Patent No.: US 7,720,616 B2
(45) Date of Patent: May 18, 2010

(54) MULTI-STAGE, MULTI-USER ENGAGEMENT SUBMISSION AND TRACKING PROCESS

(75) Inventors: David A. Wyle, Newport Coast, CA (US); Makarand Karkare, Deonar (IN)

(73) Assignee: SurePrep, LLC, Newport Beach, CA (US)

( * ) Notice: Subject to any disclaimer, the term of this patent is extended or adjusted under 35 U.S.C. 154(b) by 1508 days.

(21) Appl. No.: 10/430,830

(22) Filed: May 7, 2003

(65) Prior Publication Data

US 2004/0225581 A1 Nov. 11, 2004

(51) Int. Cl.
*G06F 17/22* (2006.01)
(52) U.S. Cl. .................................. 702/31; 707/104
(58) Field of Classification Search ............... 705/31; 707/104
See application file for complete search history.

(56) References Cited

U.S. PATENT DOCUMENTS

| | | | |
|---|---|---|---|
| 4,754,326 A | 6/1988 | Kram et al. | |
| 5,054,096 A | 10/1991 | Beizer | |
| 5,144,115 A | 9/1992 | Yoshida | |
| 5,404,294 A | 4/1995 | Karnik | |
| 5,737,599 A | 4/1998 | Rowe et al. | |
| 5,787,295 A | 7/1998 | Nakao | |
| 5,878,215 A | 3/1999 | Kling et al. | |
| 5,923,842 A | 7/1999 | Pedersen et al. | |
| 5,940,811 A | 8/1999 | Norris | |
| 5,963,926 A | 10/1999 | Kumomura | |
| 6,003,019 A | 12/1999 | Eaton et al. | |
| 6,009,442 A | 12/1999 | Chen et al. | |
| 6,012,050 A | 1/2000 | Eaton et al. | |
| 6,021,400 A | 2/2000 | Gallacher et al. | |
| 6,128,633 A | 10/2000 | Michelman et al. | |
| 6,144,380 A | 11/2000 | Shwarts et al. | |
| 6,173,285 B1 | 1/2001 | Nishita et al. | |
| 6,202,052 B1 * | 3/2001 | Miller | 705/31 |
| 6,209,095 B1 | 3/2001 | Anderson et al. | |
| 6,226,752 B1 | 5/2001 | Gupta et al. | |
| 6,237,011 B1 | 5/2001 | Ferguson et al. | |
| 6,272,484 B1 | 8/2001 | Martin et al. | |
| 6,298,357 B1 | 10/2001 | Wexler et al. | |
| 6,311,165 B1 | 10/2001 | Coutts et al. | |
| 6,338,138 B1 | 1/2002 | Raduchel et al. | |
| 6,369,811 B1 | 4/2002 | Graham et al. | |
| 6,473,741 B1 | 10/2002 | Baker | |

(Continued)

OTHER PUBLICATIONS

Cia, Patricia. Managing Your Bookmarks & Favorites, Feb. 25, 1999, SLA, p. 2.

(Continued)

*Primary Examiner*—Vanel Frenel
(74) *Attorney, Agent, or Firm*—Snell & Wilmer L.L.P.

(57) ABSTRACT

A method for submitting information for an engagement is disclosed. The method might include the steps of generating a tracking screen for tracking the submission of a plurality of files, including a tax file and an image file, each file having the same client identification code, receiving the tax file from a first client device, and updating the tracking screen to reflect the submission of the tax file. The method further might include the steps of receiving an image file from a second client device, updating the tracking screen to reflect the submission of the image file, and transmitting the plurality of files to a remote server system.

10 Claims, 8 Drawing Sheets

U.S. PATENT DOCUMENTS

| | | |
|---|---|---|
| 6,476,930 B1 | 11/2002 | Roberts et al. |
| 6,480,866 B2 | 11/2002 | Mastie |
| 6,510,466 B1 | 1/2003 | Cox et al. |
| 6,539,479 B1 | 3/2003 | Wu |
| 6,567,628 B1 | 5/2003 | Guillemin et al. |
| 6,567,789 B1 | 5/2003 | Baker |
| 6,572,661 B1 | 6/2003 | Stern |
| 6,584,505 B1 | 6/2003 | Howard et al. |
| 6,598,023 B1 | 7/2003 | Drummond et al. |
| 6,601,173 B1 | 7/2003 | Mohler |
| 6,658,464 B2 | 12/2003 | Reisman |
| 6,721,783 B1 * | 4/2004 | Blossman et al. ........... 709/206 |
| 6,957,384 B2 | 10/2005 | Jeffery et al. |
| 7,171,615 B2 | 1/2007 | Jensen et al. |
| 7,234,103 B1 * | 6/2007 | Regan ........................ 715/234 |
| 7,257,553 B1 | 8/2007 | Baker |
| 2001/0037268 A1 | 11/2001 | Miller |
| 2001/0044762 A1 | 11/2001 | Nault |
| 2002/0161698 A1 | 10/2002 | Wical |
| 2002/0161796 A1 | 10/2002 | Sylthe |
| 2003/0036912 A1 * | 2/2003 | Sobotta et al. ................. 705/1 |
| 2003/0061131 A1 * | 3/2003 | Parkan, Jr. ................... 705/30 |
| 2003/0163547 A1 | 8/2003 | Beisty et al. |
| 2003/0233296 A1 * | 12/2003 | Wagner ....................... 705/31 |
| 2004/0024665 A1 | 2/2004 | Foster |
| 2004/0088233 A1 | 5/2004 | Brady et al. |
| 2004/0150854 A1 | 8/2004 | Sprague et al. |
| 2004/0216057 A1 | 10/2004 | Wyle et al. |
| 2004/0243626 A1 | 12/2004 | Wyle et al. |
| 2005/0038722 A1 | 2/2005 | Throndson et al. |
| 2005/0102283 A1 | 5/2005 | Anderson et al. |
| 2006/0026083 A1 | 2/2006 | Wyle |
| 2006/0155618 A1 | 7/2006 | Wyle |
| 2006/0178961 A1 | 8/2006 | Stanley et al. |
| 2007/0033118 A1 | 2/2007 | Hopkinson |
| 2008/0082432 A1 | 4/2008 | Baker |
| 2008/0319882 A1 | 12/2008 | Wyle |

OTHER PUBLICATIONS

Harvey, Greg. Adobe Acrobat 5 PDF for Dummies, 2002, Wiley Publishing, Inc., pp. 13-34.

MSPivot, Microsoft Office Excel PivotTable Reports 101, downloaded on Sep. 14, 2008 from http://office.microsoft.com/em-us/excel/HA010346321033.aspx?ac=, 12 pages.

IntelliTax for Windows and DOS, Accounting Technology, v 18, n 9, p. 38, Oct. 2002.

* cited by examiner

| Client ID # | Type | Date | Client Name | Primary Contact | 📁 | ☁ | 🗋 | 💾 | Com |
|---|---|---|---|---|---|---|---|---|---|
| 1-12345 | I | 2002 | Smith, John | Smith, Oley | ✓ | × | ✓ | × | Delete |
| 12-123456 | I | 2002 | Jackson, Robert | Smith, Oley | × | × | ✓ | × | Delete |
| 12333 | I | 2002 | Esenberg, Marty | Wier, Bret | × | × | × | × | Delete |
| 1234 | I | 2002 | Smith, Mary | Hughes, Elizabeth | ✓ | ✓ | ✓ | Submit | Delete |
| 12345 | I | 2002 | Smith, Phyllis | Wier, Bret | × | × | ✓ | × | Delete |
| 123456 | I | 2002 | Jones, Paul | Wier, Bret | × | × | ✓ | × | Delete |
| 22222 | I | 2002 | Home, Phyllis | Nicholson, Jack | NA | × | × | × | Delete |
| 489935 | I | 2002 | Brown, Merit | Brown, Jack | ✓ | × | × | × | Delete |
| 49596969 | I | 2002 | Kensey, John | Hughes, Elizabeth | ✓ | × | ✓ | × | Delete |
| 499872 | I | 2002 | Hamilton, George | Hannibal, Dade | × | × | ✓ | × | Delete |
| 52354 | I | 2002 | Brown, John | Rennido, Lindo | × | × | ✓ | × | Delete |
| 561324 | I | 2002 | As, Cosyben | Wier, Bret | × | × | ✓ | × | Delete |
| 9989 | I | 2002 | Lareta, Belon | Wier, Bret | ✓ | × | × | × | Delete |
| 949-19 | I | 2002 | Jones, Jack | Hughes, Elizabeth | × | × | × | × | Delete |
| 97837 | I | 2002 | Black, Tom | Green, Meducci | × | × | × | × | Delete |
| 907548 | I | 2002 | Washington, Martha | Hughes, Elizabeth | × | × | ✓ | × | Delete |
| 9999 | I | 2002 | Smith, John | Wier, Bret | × | × | × | × | Delete |
| Bookmark | B | 2002 | Merrit Book | Brown, Jack | × | × | × | × | Delete |

H.S Record - 18

*FIG. 3*

MULTI-STAGE, MULTI-USER ENGAGEMENT SUBMISSION AND TRACKING PROCESS

BACKGROUND OF THE INVENTION

1. Field of the Invention

The present invention relates generally to a multi-stage submission process, and more particularly to a multi-stage, multi-user engagement submission and tracking process.

2. Description of the Related Art

In the computer industry, many features have been developed and used to simplify and standardize the way a computer user completes a set of tasks. One such feature, commonly referred to as a "wizard", provides a user with a step-by-step process for correctly and accurately completing a desired task or set of tasks. Wizards allow a single user during a single session to systematically follow a step-by-step process whereby the user provides or submits information, for example, via a series of sequentially displayed windows or graphical user interfaces (GUIs), to complete the desired task. The GUIs are organized in a pre-defined order so that the user can easily proceed through the process without any prior training on how to use the wizard and will be notified when the process is completed.

Many word processing programs, such as Word from Microsoft Corporation of Redmond, Wash., include wizards, for example, a letter wizard, for providing the user with a step-by-step process of creating and formatting a letter. As an example, the letter wizard might prompt the user for the recipient's name, the recipient's address, the style of the letter, the type of salutation, and so on. Once the user has input the requested information, the letter wizard creates a letter according to the user's input. At any time, the user may exit the letter wizard, and based on the information provided up to that point, a letter will be created. For example, if the user does not have the recipient's address, the user may choose to exit the letter wizard without that information, and a letter will be created without the recipient's address inserted into the letter. Once the user exits the letter wizard, the user is unable to restart the letter wizard for that particular letter and will be required to manually input the omitted information, for example, the recipient's address. Without the use of a letter wizard, the user will have to create and format the entire letter from scratch, which is time consuming and error prone.

Other types of wizards allow the user to move through a series of GUIs, each of which requires the user to input information before proceeding to the next GUI. For example, after the user inputs the information required for the first GUI, the user inputs the information required for the second GUI, and so on, until the user is notified that the process is complete. Hence, these types of wizards ensure that all the required information has been input by the user before the desired task is completed. Often, the user may not know or may not have the requested information for input into a particular GUI. In these situations, the user is unable to proceed to the next GUI and is also unable to save the currently input information. Therefore, the user may have to exit the wizard, losing all the information that has been input, and start the entire submission process over at a later time, once the requested information becomes available.

As an example, a credit card company may use a wizard for allowing applicants to apply for a credit card. This ensures that an applicant has input all the information needed by the credit card company for processing the credit card application. Without the wizard, the credit card company may be required to contact the applicant to request missing information, thus delaying the processing of the credit card application. Hence, wizards can save companies, for example, the credit card company, a significant amount of time and resources.

SUMMARY OF THE INVENTION

One drawback of conventional wizards is the inability to move to a subsequent step, e.g., GUI, until all of the required information in the preceding step(s) has been input. For example, the second step of a wizard cannot be accessed until all the required information in the first step has been input. Another drawback is that conventional wizards require a single person to complete all the steps of the submission process of an engagement in a single session. Hence, the submission for an engagement cannot begin until all the information for the engagement is available. Additional drawbacks of conventional wizards include the inability to enter a step of the wizard in a non-sequential order, save the information input into the wizard until all the steps of the wizard have been completed, reenter a step of the wizard once all the steps of the wizard have been completed, determine the status of the information to be input into the wizard, and determine the number of tasks awaiting completion for a particular engagement due to non-availability of information. Therefore, a need exists for a multi-stage, multi-user engagement submission and tracking process.

In accordance with the present invention, a computer-implemented method for submitting information for an engagement might include the steps of generating a tracking screen for tracking the submission of a plurality of files, including one or more tax files and one or more image files, each file having the same client identification code, receiving the tax file from a first client device, and updating the tracking screen to reflect the submission of the tax file. The method might further include the steps of receiving an image file from a second client device, updating the tracking screen to reflect the submission of the image file, and transmitting the plurality of files to a remote server system.

Another embodiment of the present invention is a method for providing a plurality of submission screens for facilitating the submission of documents to a main server system for enabling a service provider to perform an engagement using the documents, the plurality of submission screens being accessible by a user using the client device in an order selected by the user. The method might include the steps of receiving a first selection from the user, and based on the first selection, generating a first submission screen, and receiving first information, which is submitted using the first submission screen. The method might further include the steps of receiving a second selection from the user, and based on the second selection, generating a second submission screen, and receiving second information, which is submitted using the second submission screen.

Advantages of the present invention include providing a submission process that can be performed by multiple users, each of whom can have a specialized skill and can be located in a different location. The submission process allows the submission of multiple documents, files or other information when it becomes available, which may be at different times. For example, the submission of one document is not dependent on the submission of another document. Hence, the submission process does not stop because of the non-availability of a document. Also, multiple users can directly enter and input information into any step of the submission process from different locations at different times. In addition, a manager or supervisor can easily track the status of the submission process and can follow up for completion of the submission.

These and other features and advantages of the embodiments of the invention will become apparent from the following detailed description, taken in conjunction with the accompanying drawings, which illustrate, by way of example the principles of the invention.

BRIEF DESCRIPTION OF THE DRAWINGS

FIG. 3 is a tracking screen generated by the main server system in order to allow a user to initiate a multi-stage, multi-user engagement and tracking submission process in accordance with an embodiment of the present invention;

DETAILED DESCRIPTION OF THE PRESENTLY PREFERRED EMBODIMENTS

Systems and methods that implement the embodiments of the various features of the present invention will now be described with reference to the drawings. The drawings and the associated descriptions are provided to illustrate embodiments of the present invention and not to limit the scope of the present invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" in various places in the specification are not necessarily all referring to the same embodiment. The appearances of the phrase "user" in various places in the specification are not necessarily all referring to the same "user". Throughout the drawings, reference numbers are reused to indicate correspondence between referenced elements. In addition, the first digit of each reference number indicates the figure in which the element first appears.

Figure 1:
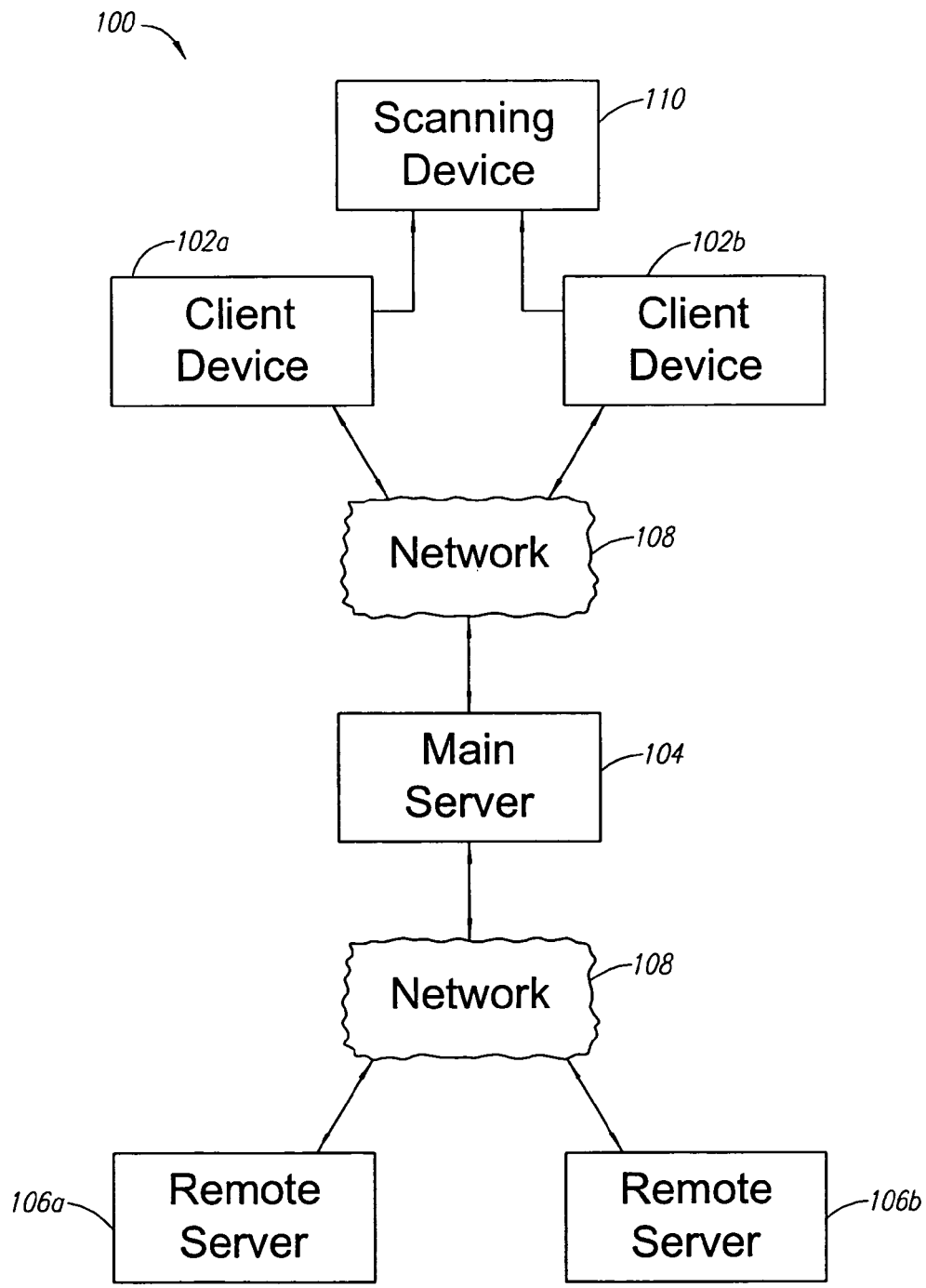
FIG. 1 is a simplified block diagram illustrating a client-server system in accordance with an embodiment of the present invention.

FIG. 1 is a simplified block diagram illustrating a client-server system 100 having a number of client devices 102, a main server system 104, and a number of remote server systems 106, all of which can communicate with one another via a network 108, for example the Internet. For illustrative purposes, the client-server system 100 can include two client devices 102a, 102b, one main server system 104, and two remote server systems 106a, 106b, all of which can be connected to one another via the network 108. The client devices 102 are typically desktop computers. Alternatively, the client devices 102 can be laptop computers, palmtop computers, handheld devices or any other device(s) capable of communicating with the main server 104. The client-server system 100 can also include a scanning device 110, such as a scanner, for communicating with one or more client devices 102. The client devices 102 can be used to receive, access, view, edit and transmit information embodied in the form of, for example, documents and files.

The main server system 104 is a server, such as a ProLiant Server from Hewlett-Packard Company of Palo Alto, Calif., for routing and processing the information and requests received from the client devices 102 and the remote server systems 106. The main server system 104 can include a database for storing the information. In addition, the main server system 104 can copy and transfer the information to and delete the information from the client devices 102 and the remote server systems 106. The remote server systems 106 can be similar to the client devices 102 or the main server system 104.

Figure 2:
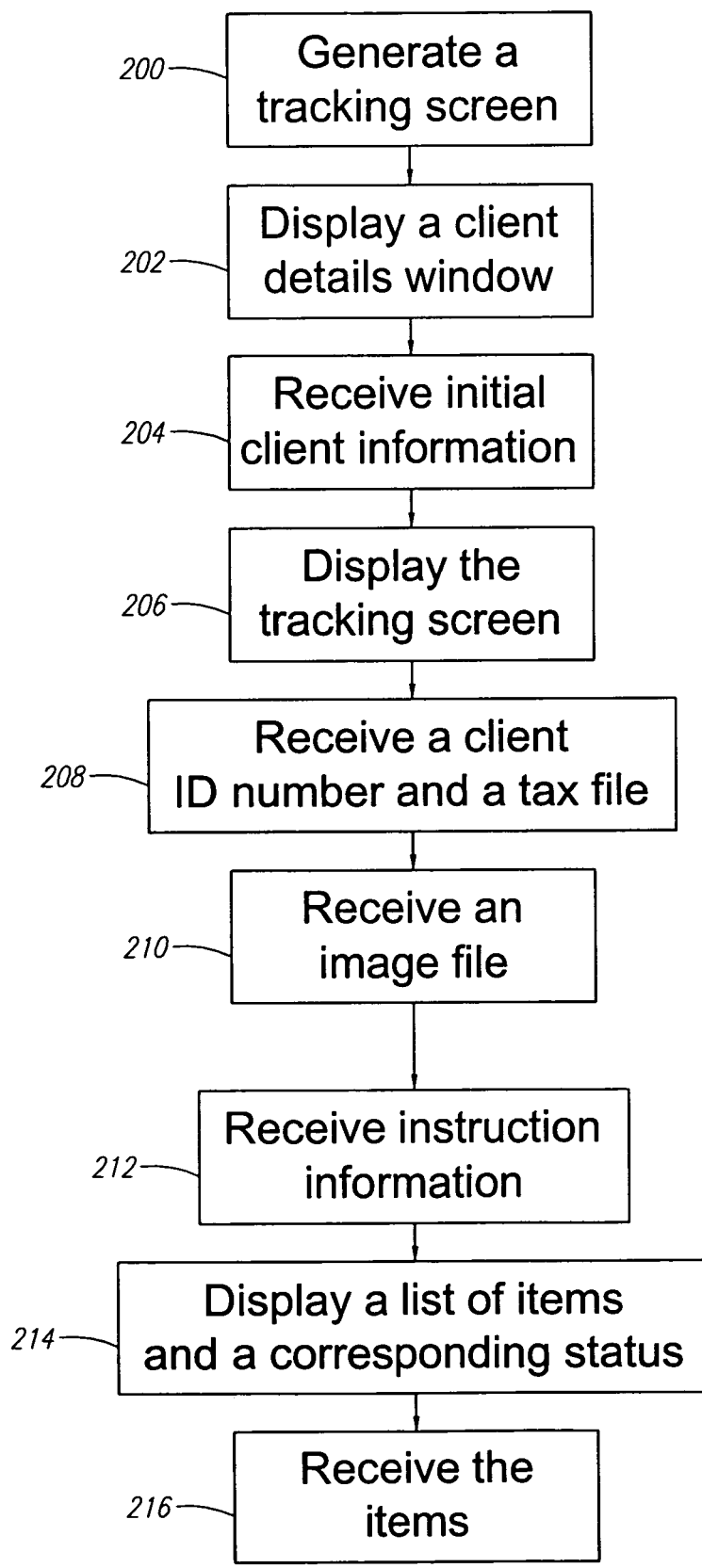
FIG. 2 is a flowchart illustrating a method of submitting information at different times and from different locations using a wizard in accordance with an embodiment of the present invention.

FIG. 2 is a flowchart illustrating a method of submitting information at different times and from different locations using a wizard. Initially, a user logs on to the main server system 104 and selects (or clicks on) a tracking icon to instruct the main server system 104 to retrieve or generate a tracking screen 300 as shown in FIG. 3 (step 200). The tracking screen 300 can include a pull-down menu 301 for displaying the engagements that are (1) awaiting submission (shown in FIG. 3), (2) in preparation, (3) ready for review by customer, and (4) accepted by customer. The term "user" may refer to a customer, an individual, a group of individuals, a company or an electronic device such as a computer. The term "engagement" may be defined as a job, project or task such as the preparation of income tax returns, financial statements, financial records, loan applications or any other defined task having a set of input and a desired output. The tracking screen 300 is generated by the main server system 104 in order to allow the user to initiate and track a tracking and submission procedure, for example, a number of multi-stage, multi-user engagements. That is, the tracking screen 300 allows the user to track the status of pending multi-user submissions for a number of multi-stage engagements. Before the status of an engagement can be tracked, the user needs to begin or create an engagement.

Figure 4:
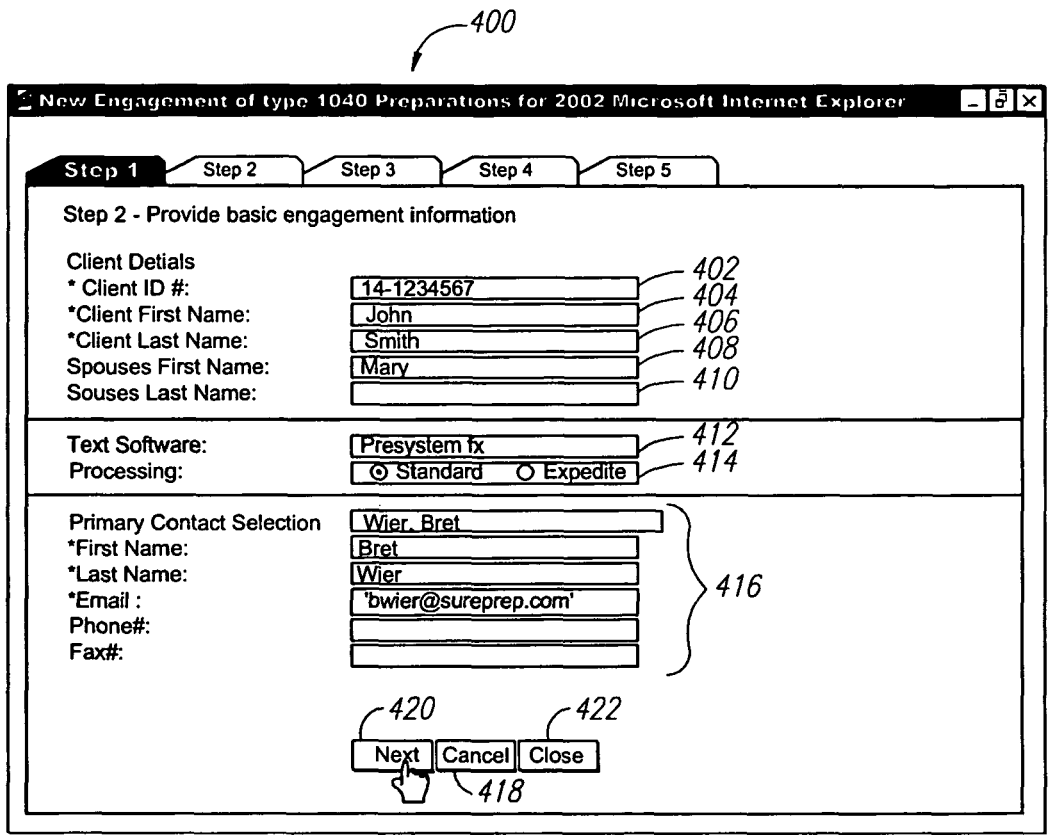
FIG. 4 is a view of a client details window (step 1) of a wizard in accordance with an embodiment of the present invention.

To begin an engagement, the user can select a new engagement button 302 located on the tracking screen 300 to start the wizard. Upon selecting the new engagement button 302, the main server system 104 displays a client details window 400 (step 202), which is shown in FIG. 4. Step 1 of the wizard requests the user to provide initial client information via the client details window 400. The client details window 400 includes a number of fields for inputting the initial client information, which can include a client identification code 402, a client's first name 404, a client's last name 406, a spouse's first name 408, and a spouse's last name 410. In one embodiment, the client identification code 402 is automatically generated by the main server system 104. The client details window 400 also allows the user to select a tax software package 412 that is used by the client and a processing type 414, for example, standard or expedite, for the particular engagement. The tax software package 412 can include ProSystem FX Tax, GoSystem RS Tax, Lacerte and UltraTax. The initial client information can also include primary contact information 416 of a person or firm who may be contacted regarding the particular engagement. The user can cancel the engagement by selecting a cancel button 418. After the initial client information has been input, the user can select a next button 420 to go to the next step (e.g., step 2) of the wizard or a close button 422 to return to the tracking screen 300, which may display a new row of information, identified by the client identification code 402, pertaining to the new engagement. After selecting the next button 420 or the close button 422, the main server system 104 receives the initial client information, creates a folder corresponding to the client identification code 402, and stores the initial client information in the folder. Hence, the main server system 104 can store, retrieve and display on the tracking screen 300 the information contained in the folder.

Once the user sets up an engagement, the main server system 104 and the client devices 102 can be used to complete the remaining steps, for example, steps 2-5, of the wizard. For illustrative purposes, the client devices 102a, 102b are used to complete steps 2-5 of the wizard. The user generally requests the service provider to perform and complete the engagement. The term "service provider" may refer to an individual such as an accountant, a group of individuals, a company such as an accounting firm or an electronic device such as a computer. Before the engagement can be performed and ultimately completed, the user, using one or more client devices 102, or the service provider, using the main server system 104, submits information pertaining to the engagement using the wizard.

Using the client device 102a, the user can log on to the main server system 104 and instruct the main server system 104 to display the tracking screen 300 (step 206). For example, in one embodiment, the main server 104 displays the tracking screen 300 with only the engagements authorized by the user's login and password information. Thereafter, the user locates the desired engagement by visually inspecting the list of engagements or performing a search by inputting the client's first name 404 or the client's last name 406 in a first data entry field 304 or the client identification code 402 in a second data entry field 306. After the desired engagement has been located, the user selects the client identification code 402 corresponding to the desired engagement.

The user can select an icon depending on the type of information to be submitted. The icons 308, 310, 312, 314 can relate to the information being submitted and can vary according to the engagement. For example, if the engagement is the preparation of an income tax return, then the icons can include, for example, a tax icon 308, a scan icon 310, an instruction icon 312 and a submit icon 314. The user can go to (i.e., display) one of the steps of the wizard by selecting one of the icons. For example, the user can go to step 2 of the wizard by selecting the tax icon 308, step 3 of the wizard by selecting the scan icon 310, step 4 of the wizard by selecting the instruction icon 312 and step 5 of the wizard by selecting the submit icon 314. Hence, the user can advantageously go to and complete (i.e., input information into) any step of the wizard, without having to complete all the previous steps, by selecting the desired icon and inputting the information into the selected window. Furthermore, multiple users can complete different steps of the wizard for the same engagement at different times from different locations. For example, a user in Los Angeles, Calif. using the client device 102a can complete steps 2 and 4 on Tuesday and a user in New York, N.Y. using the client device 102b can complete steps 3 and 5 on Friday. For each engagement, the tracking window 300 indicates whether each step has been completed. That is, the √ symbol indicates that the step has been completed, the X symbol indicates that the step has not been completed and the Submit symbol indicates that all of the steps have been completed and the information is ready to be submitted to the main server system 104 so that the service provider can perform the engagement.

Figure 5:
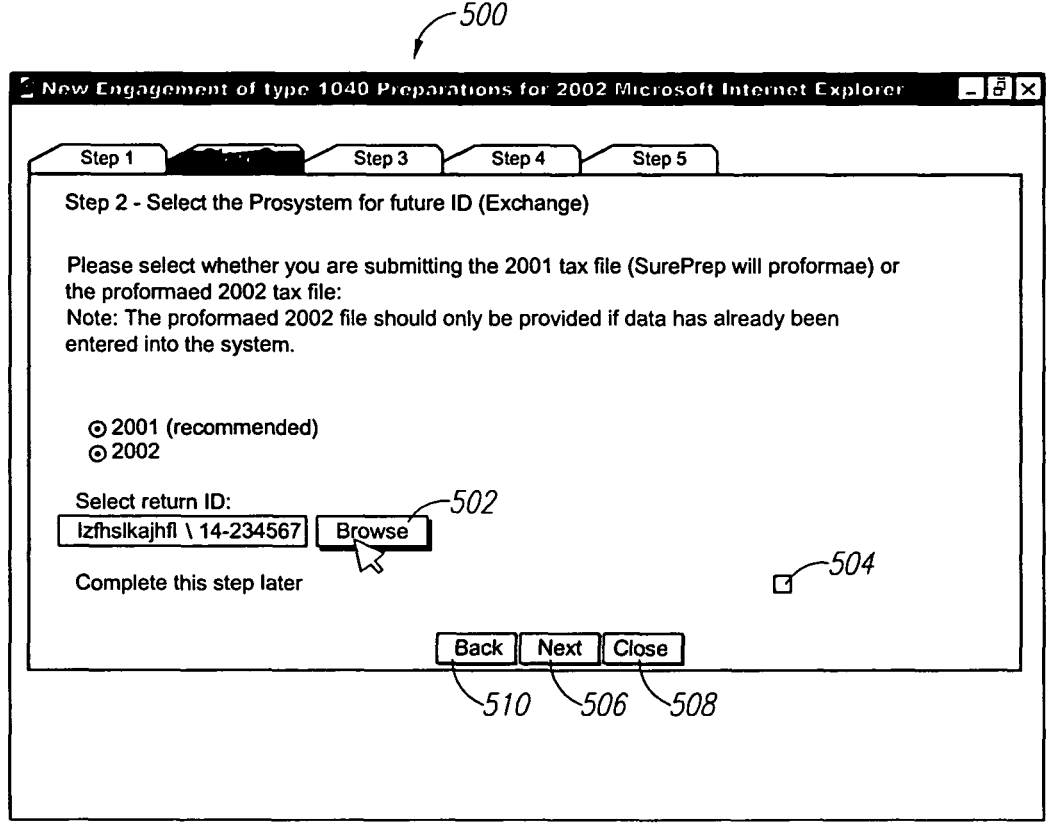
FIG. 5 is a view of an upload files window (step 2) of the wizard in accordance with an embodiment of the present invention.

After the particular engagement has been selected, using the above icons as an example, the user can select the tax icon 308 for displaying an upload files window 500 as shown in FIG. 5. The upload files window 500 allows the user to browse for (using a browse button 502) and retrieve a file that is to be transmitted from the client device 102a to the main server system 104. In one embodiment, the upload files window 500 allows the user to retrieve and transmit a tax file such as the previous year's (e.g., 2001) tax file or the current year's (e.g., 2002) proformaed tax file. The user can also select a box 504 for completing this step later. The year and the tax file (if selected) along with the client identification code 402 corresponding to the selected engagement are transmitted from the client device 102a to the main server system 104 (step 208) when the user selects a next button 506 to go to the next step (e.g., step 3) of the wizard or a close button 508 to return to the tracking screen 300. The year and the file are saved in the folder corresponding to the client identification code 402 of the particular engagement. If the file for the particular engagement was selected, the {square root} symbol will appear on the tracking screen 300 in the row of the particular engagement and in the column of the tax icon 308. The user can go to the previous step (e.g., step 1) of the wizard by selecting a back button 510.

Figure 6:
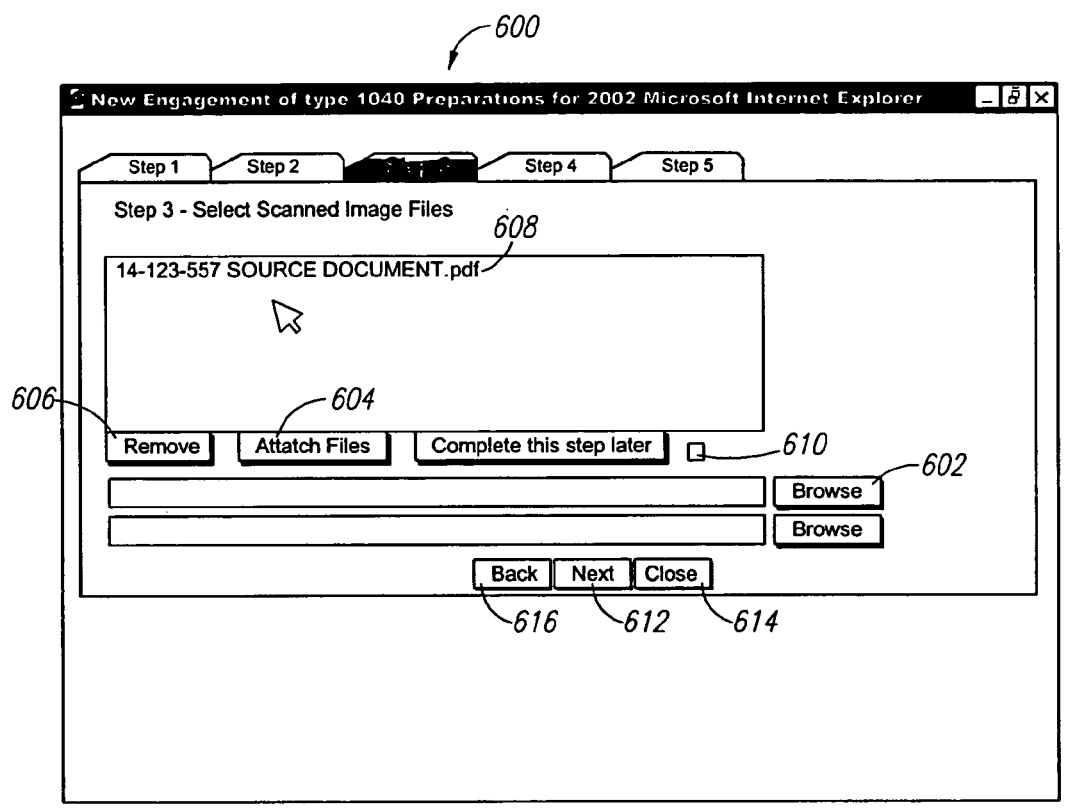
FIG. 6 is a view of an upload images window (step 3) of the wizard in accordance with an embodiment of the present invention.

The user can select the scan icon 310 for displaying an upload images window 600 as shown in FIG. 6. The upload images window 600 allows the user to browse for (using a browse button 602) and retrieve an image file, such as a portable document format (PDF) file, a tagged image file format (TIFF) file, a joint photographic experts group (JPEG) file or any other type of electronic file that can be stored on the client device 102, that is to be transmitted from the client device 102a to the main server system 104. The image file can include scanned tax documents, such as 1099s, W-2s, K-1s, dividend statements, income statements, profit and loss statements and settlement statements, for assisting the service provider in preparing the engagement. The files can be retrieved and transmitted by a different user from a different location using the client device 102b. For example, the tax files and the image files can be transmitted by different users from different locations at the same time or at a different time. The image file can be attached by selecting an attach files button 604 and removed by selecting a remove button 606. If an image file was inadvertently attached, selecting the image file name 608 and then the remove button 606 will remove the image file. The user can also select a box 610 for completing this step later. The image file (if selected) along with the client identification code 402 corresponding to the selected engagement are transmitted from the client device 102a to the main server system 104 (step 210) when the user selects a next button 612 to go to the next step (e.g., step 4) of the wizard or a close button 614 to return to the tracking screen 300. The image file is saved in the folder corresponding to the client identification code 402 of the particular engagement. If the file for the particular engagement was selected, the √ symbol will appear on the tracking screen 300 in the row of the particular engagement and in the column of the scan icon 310. The user can go to the previous step (e.g., step 2) of the wizard by selecting a back button 616.

Figure 7:
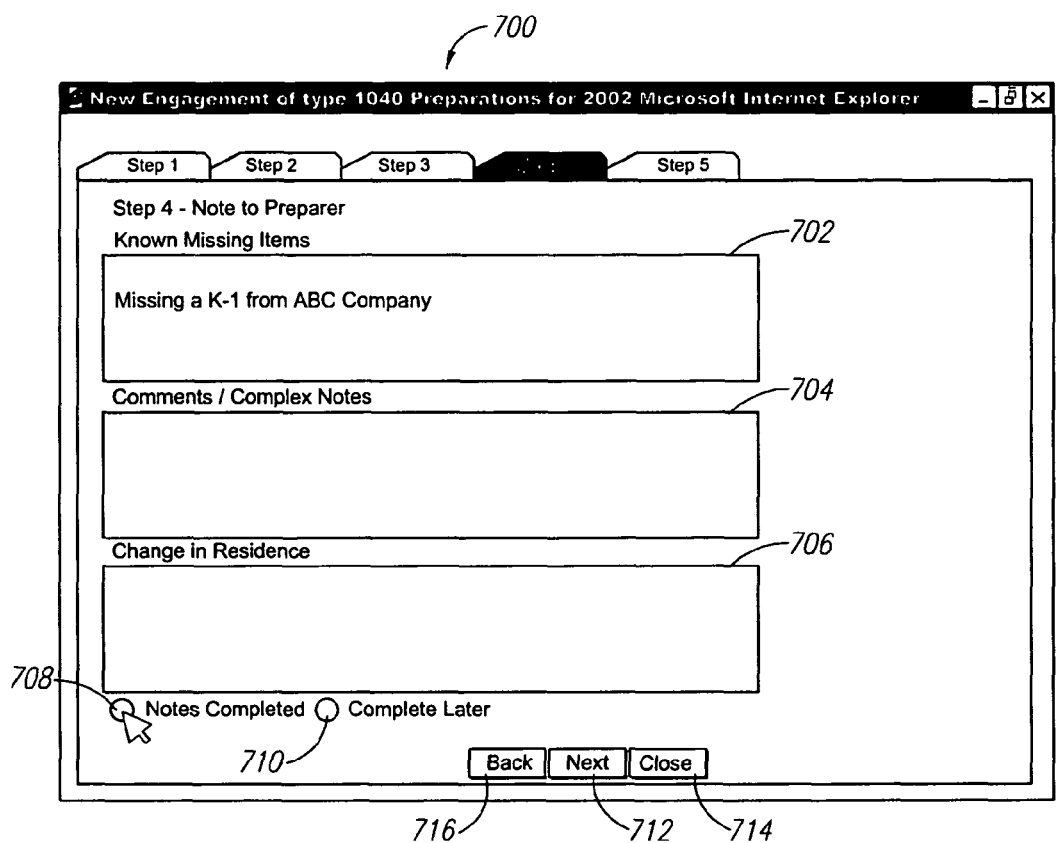
FIG. 7 is a view of an instructions window (step 4) of the wizard in accordance with an embodiment of the present invention.

The user can select the instruction icon 312 for displaying an instructions window 700 as shown in FIG. 7. The instructions window 700 allows the user to input instructions to the service provider regarding the engagement that are to be transmitted from the client device 102a to the main server system 104. In one embodiment, the instructions window 700 might include a known missing items input field 702, a comments/complex issues input field 704 and a change in residency input field 706. For example, if a K-1 from ABC Company is missing from the image file, the user can input this information in the known missing items input field 702. Similarly, for example, if the user needs to inform the service provider of a comment/complex issue or a change in residency, the user can input this information in the comments/ complex issues input field 704 and the change in residency input field 706, respectively. The user can select a box 708 if the notes are completed or a box 710 for completing this step later. If the notes are completed, the information contained in the input fields 702, 704, 706 along with the client identification code 402 corresponding to the selected engagement are transmitted from the client device 102*a* to the main server system 104 (step 212) when the user selects a next button 712 to go to the next step (e.g., step 5) of the wizard or a close button 714 to return to the tracking screen 300. The information is saved in the folder corresponding to the client identification code 402 of the particular engagement. If the box 708 was selected, the √ symbol will appear on the tracking screen 300 in the row of the particular engagement and in the column of the instruction icon 312. The user can go to the previous step (e.g., step 3) of the wizard by selecting a back button 716.

Figure 8:
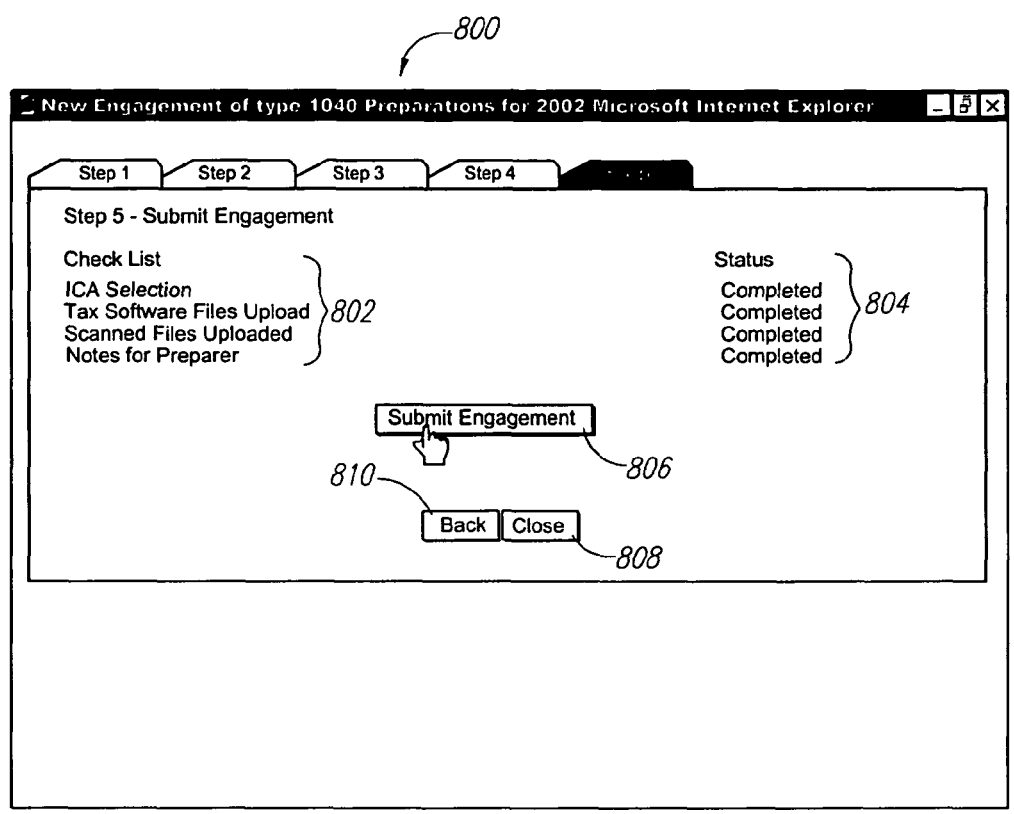
FIG. 8 is a view of a submit engagement window (step 5) of the wizard in accordance with an embodiment of the present invention.

The user can select the submit icon 314 for displaying a submit engagement window 800 as shown in FIG. 8. The submit engagement window 800 allows the user to view a list of items 802 (e.g., the client information, the tax file, the image file and the instruction information) for submission for the engagement and the status 804 for each item (step 214). If the status 804 of each item indicates that the submission has been completed, the user, by clicking a submit engagement button 806, instructs the client device 102*a* to transmit the items to the main server system 104 (step 216). In one embodiment, the items along with the client identification code 402 corresponding to the selected engagement are transmitted from the client device 102*a* to the main server system 104 (step 208) when the user selects the submit engagement button 806. The items are saved in the folder corresponding to the client identification code 402 of the particular engagement. If the items are submitted for the particular engagement, the engagement is removed from the tracking screen 300. If the user selects a close button 808, the tracking screen 300 is displayed. The user can go to the previous step (e.g., step 4) of the wizard by selecting a back button 810.

After the engagement has been submitted, the main server system 104 copies the folder, including the information and/ or items contained therein, to at least one of the remote server systems 106. The service provider (e.g., a tax preparer) at the remote server system 106 receives the information pertaining to the engagement and can perform the engagement. The submitted engagements can be displayed on the tracking screen 300 by selecting in preparation on the pull-down menu 301. Once the engagement is complete, the completed engagement documents are transmitted from the remote server system 106 to the main server system 104. The main server system 104 can automatically send an email to the email address listed in the primary contact information 416 notifying the person or firm that the engagement, identified by the client identification code 402, has been completed. Hence, the completed engagement documents are ready for review by the user. Using the client device 102*a*, the user can log on to the main server system 104 to review the completed engagement documents. The list of engagements can be displayed on the tracking screen 300 by selecting ready for review by customer on the pull-down menu 301. The user can review the completed engagement documents and either accept or resubmit the engagement. Typically, the user resubmits the engagement if the completed engagement documents are incorrect or are incomplete. If resubmitted, the user can provide notes to the service provider stating why the engagement was resubmitted. The user motes are transmitted to the remote server system 106*a* responsible for preparing the engagement. The service provider that performed the engagement can edit or revise the completed engagement documents and send the documents to the main server system 104. Once the user accepts the engagement, the accepted engagements can be displayed on the tracking screen 300 by selecting accepted by customer on the pull-down menu 301. Once accepted, the main server system 104 automatically deletes the folder and the files, e.g., the completed engagement documents, relating to the engagement from the remote server system 106.

Although an exemplary embodiment of the invention has been shown and described, many other changes, combinations, omissions, modifications and substitutions, in addition to those set forth in the above paragraphs, may be made by one having skill in the art without necessarily departing from the spirit and scope of this invention. Other embodiments are within the scope of the following claims. Accordingly, the present invention is not intended to be limited by the preferred embodiments, but is to be defined by reference to the appended claims.

What is claimed is:

1. A computer-implemented method for submitting information for an engagement from client devices to a main server system, comprising:

generating an income tax return tracking screen for tracking all of a plurality of electronic income tax return files submitted for a first income tax preparation engagement, the plurality of electronic income tax return files submitted for the first income tax preparation engagement including a tax file and a first image file, and all of the plurality of electronic income tax return files submitted for the first income tax preparation engagement having an identical first identification code;

receiving at the main server system the tax file having the identical first identification code submitted from a first client device;

updating the income tax return tracking screen to reflect the submission of the tax file having the identical first identification code;

receiving at the main server system a second image file having the identical first identification code submitted from a second client device different from the first client device;

updating the income tax return tracking screen to reflect the submission of the second image file having the identical first identification code; and transmitting all of the plurality of electronic income tax return files having the identical first identification code from the main server system to a remote server system.

2. The method of claim 1, wherein the tax file is a previous year's tax file or a current year's tax file.

3. The method of claim 1, wherein the first image file and the second image file each include a plurality of tax documents.

4. method of claim 3, wherein the plurality of tax documents are selected from a group consisting of a 1099, W-2, K-1, dividend statement, income statement, profit and loss statement and settlement statement.

5. The method of claim 1, further comprising:

receiving instruction data from the first client device or the second client device; and updating the income tax return tracking screen to reflect the submission of the instruction data.

6. The method of claim 1, further comprising:
generating an income tax return tracking screen for tracking all of a plurality of electronic income tax return files submitted for a second income tax preparation engagement, the plurality of electronic income tax return files submitted for the second income tax preparation engagement including a second tax file and a third image file, and all of the plurality of electronic income tax return files submitted for the second income tax preparation engagement having an identical second identification code different from the first identification code;
receiving at the main server system the second tax file having the identical second identification code submitted from a third client device;
updating the income tax return tracking screen to reflect the submission of the second tax file having the identical second identification code;
receiving at the main server system a fourth image file having the identical second identification code submitted from a fourth client device different from the third client device;
updating the income tax return tracking screen to reflect the submission of the fourth image file having the identical second identification code; and
transmitting all of the plurality of electronic income tax return files having the identical second identification code from the main server system to a remote server system.

7. The method of claim 1, wherein the identical first identification code is automatically generated by the main server system.

8. A system for submitting information for an engagement from client devices to a main server system, comprising:
means for generating a tracking screen for tracking all of a plurality of electronic files submitted for a first income tax preparation engagement, wherein the plurality of electronic files submitted for the first income tax preparation engagement include a first tax file and a first image file and all of the plurality of electronic files submitted for the first income tax preparation engagement have an identical first identification code;
means for automatically generating the identical first identification code;
means for receiving the first tax file having the identical first identification code submitted from a first client device, wherein the first tax file is a previous year's tax file or a current year's tax file;
means for updating the tracking screen for tracking all of the plurality of electronic files submitted for the first income tax preparation engagement to reflect the submission of the first tax file having the identical first identification code;
means for receiving a plurality of tax documents having the identical first identification code submitted from a second client device different from the first client device;
means for updating the tracking screen for tracking all of the plurality of electronic files submitted for the first income tax preparation engagement to reflect the submission of the plurality of tax documents having the identical first identification code;
means for updating the tracking screen to reflect the submission of a plurality of electronic files submitted for a second income tax preparation engagement, wherein the plurality of electronic files submitted for the second income tax preparation engagement includes a second tax file and a second image file and all of the plurality of electronic files submitted for the second income tax preparation engagement have an identical second identification code;
means for automatically generating the second identification code different from the first identification code;
means for receiving the second tax file having the identical second identification code submitted from a third client device;
means for receiving a plurality of tax documents having the identical second identification code submitted from a fourth client device different from the third client device;
means for receiving instruction data from the first client device or the second client device;
means for updating the tracking screen for tracking all of the plurality of electronic files submitted for the first income tax preparation engagement to reflect the submission of the instruction data;
means for receiving instruction data from the third client device or the fourth client device;
means for updating the tracking screen for tracking all of the plurality of electronic files submitted for the second income tax preparation engagement to reflect the submission of the instruction data; and
means for transmitting the plurality of electronic files having the identical first identification code and the plurality of electronic files having the identical second identification code to a remote server system.

9. The system of claim 8, wherein the first tax file and the second tax file is a current year's proformaed tax file.

10. The system of claim 8, wherein the first tax file and the second tax file each include information selected from a group consisting of a 1099, W-2, K-1, dividend statement, income statement, profit and loss statement and settlement statement.

* * * * *